(12) United States Patent
Wood

(10) Patent No.: US 7,647,768 B1
(45) Date of Patent: Jan. 19, 2010

(54) TORQUE CONVERTER TRANSMISSION

(75) Inventor: George William Wood, 307 Johnston Rd., Ninety Six, SC (US) 29666

(73) Assignee: George William Wood, Ninety Six, SC (US)

( * ) Notice: Subject to any disclaimer, the term of this patent is extended or adjusted under 35 U.S.C. 154(b) by 251 days.

(21) Appl. No.: 11/977,380

(22) Filed: Oct. 24, 2007

(51) Int. Cl.
*F16D 33/02* (2006.01)
(52) U.S. Cl. .......................................... 60/363; 60/348
(58) Field of Classification Search .................... 60/335, 60/348, 363, 330; 180/344, 346, 378
See application file for complete search history.

(56) References Cited

U.S. PATENT DOCUMENTS

| 2,341,624 | A | * | 2/1944 | Kieser | .......................... 60/348 |
| 3,324,650 | A | * | 6/1967 | Staudenmaier | ............... 60/348 |
| 4,964,843 | A | * | 10/1990 | Wahl | ........................... 475/34 |
| 5,394,694 | A | | 3/1995 | Doumov | |
| 5,746,296 | A | | 5/1998 | Wirtz | |
| 6,569,048 | B1 | | 5/2003 | Swales | |
| 7,128,680 | B2 | | 10/2006 | Holmes | |

* cited by examiner

*Primary Examiner*—Michael Leslie

(57) ABSTRACT

An automatic transmission consisting of a housing to support multiple torque converters in series with each other. The housing is used to align the converters, direct the output of the first converter to the second and so on. The housing also provides paths for the fluid to enter and leave the converter and to operate the lock-up feature of each converter. The output of each torque converter turbine is fed to the next torque converter so that the next converter can further act on the ratio as needed until the final output is fed to a gear set to provide a reverse gear or locking mechanism.

1 Claim, 1 Drawing Sheet

TORQUE CONVERTER TRANSMISSION

FIELD OF THE INVENTION

The present invention relates automatic transmissions and more particularly to transmissions that provide a continually variable ratio of input to output speeds without gears.

BACKGROUND OF THE INVENTION

Coupling the motive force of an engine with a limited range of revolutions per minute and more especially a limited range of torque to a piece of equipment that needs to have a wide range of operating speeds requires a method of connecting the engine to the equipment with some method of varying the ratio of speeds between the two.

The most common method uses combinations of gears and means of selecting the gears needed to match the engine to the equipment. Other methods include hydraulic systems with variable pumps and motors. Recent methods in the automotive industry include using belts on adjustable pulleys. A single torque converter with a lock-up feature is most commonly used in today's vehicles with automatic transmissions in an attempt to provide a more continuous change of ratio.

Gear sets do not always correctly match the differential speeds needed and with the more gears used to solve this issue, more weight and other problems arise. Hydraulic systems waste energy at high speeds. Belt systems can not deliver higher horse power with our significant wear. A single lock-up torque converter does not provide a wide enough ratio to eliminate the need of gear sets coupled to the converter.

It is therefore an object of the invention to provide an arrangement of torque converters in series with each other to provide the torque multiplication needed by a particular vehicle.

It is another object of the invention to provide the housing to support the bearing plates between each converter in series as to support the needs of a torque converter such as fluid flow for the operation of the converter and control of the lock-up function.

It is another object of the invention to use the lock-up feature of the torque converters to create a final drive ratio of one to one with minimal loss of energy.

It is another object of the invention to use the effect of a torque converter providing a two to one torque multiplication ratio output at stall speed, to be coupled in series to a second converter and thus have a four to one ratio and as needed to continue this configuration for an eight to one ratio with three converters and so on.

SUMMARY OF THE INVENTION

In accordance with the present invention, there is provided a housing to support multiple torque converters in series with each other. The output of each converter is supported with the same features found on the input side of most common automatic transmissions, that is; a support bearing, a seal, a fluid pump, a fixed shaft for the converter stator, and an output shaft for the turbine and bearings to allow rotation of these parts. These items are held by the housing to align the converters, direct the output of the first converter to the input of the second and so on for as many torque converters as needed for the application. The housing also provides arteries for the fluid to enter and leave the converter and to operate the lock-up feature of each converter. The output of each torque converter turbine is fed through the support bearing in the housing to the next torque converter so that the next converter can further act on the ratio as needed until the final output is fed to a gear set to provide a reversing gear or locking mechanism, also known as "Park" gear.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURE.

DESCRIPTION OF THE PREFERRED EMBODIMENT

Figure 1:
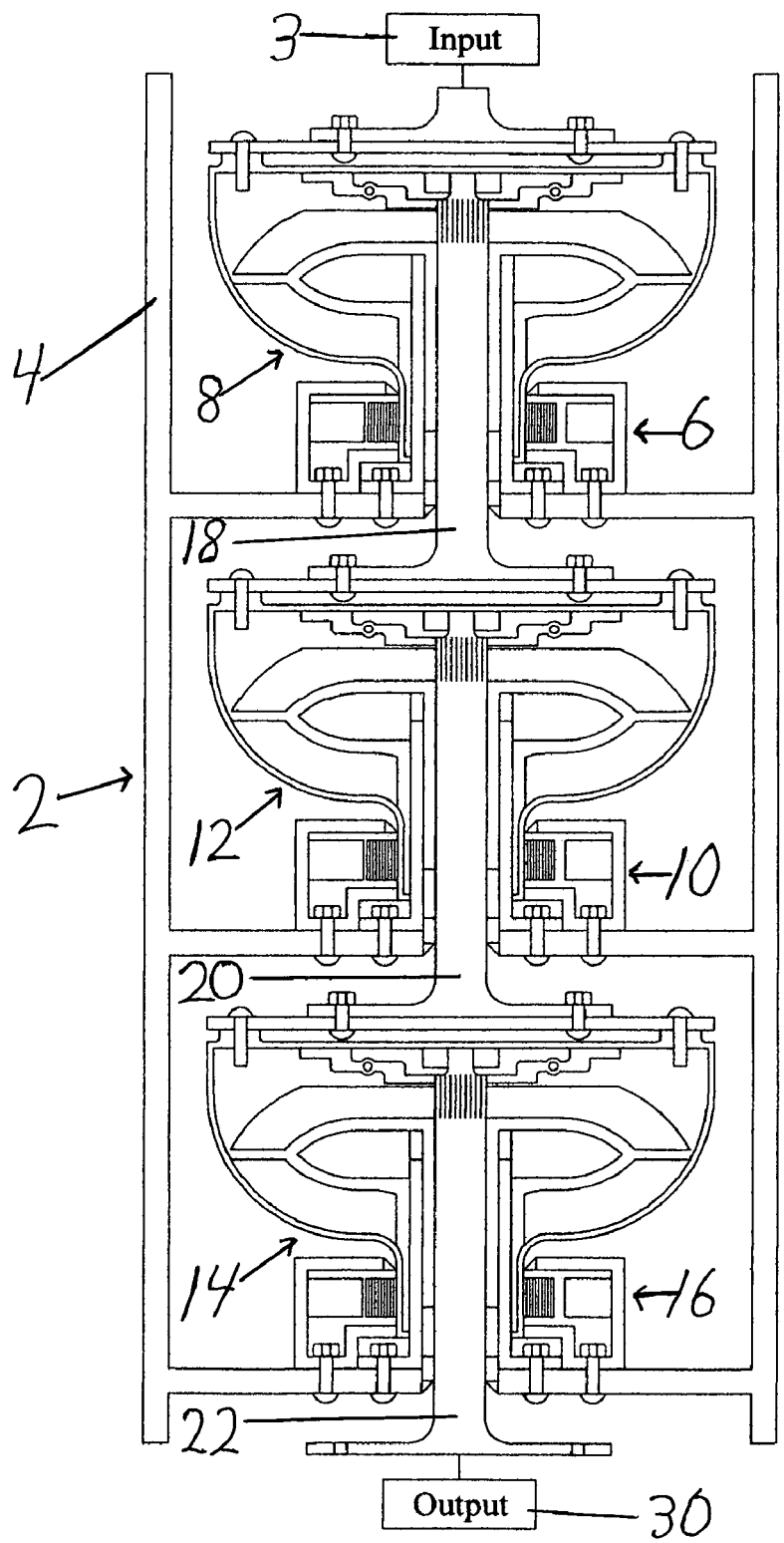
FIG. 1 is a side view of an Overview of torque converter transmission.

FIG. 1 is a perspective view of the preferred embodiment of the Torque Converter Transmission 2. First, the Motive Input 3 connects to and drives the First Torque Converter 8 by standard practices to the motive source. The Housing 4 is attached to the motive source the same as a bell Housing 4 for any transmission. The Housing 4 provides the structure for the First Bearing Plate 6, the Second Bearing Plate 10 and the "Nth" Bearing Plate 16 to reside and provide alignment of all the components with the motive source and the Final Drive 30.

The First Bearing Plate 6 and the following bearing plates are essentially the front end of any automotive type automatic transmission and serve the same functions. All the bearing plates seal the fluids, provide bearings for the rotational parts, provide a fluid pump, provide a fixed stator shaft, provide paths for control of fluids into and out of the converter and lock-up mechanism, and allow each output shaft to pass power to the next stage of the whole assembly.

The First Bearing Plate 6 passes the torque multiplied by the First Torque Converter 8 and applied to the First Output Shaft 18 though to the Second Torque Converter 12. This process is continued with the Second Output Shaft 20 driving the "Nth" Torque Converter 14 to power the "Nth" Output Shaft 22 until the requirements of torque multiplication for a specific application is achieved. Any number of torque converters can be connected in series this way to reach the desired final output.

The Housing 4 provides, by drilled passages paths connecting to the bearing plates, for the fluid used by torque converters. Controls for the fluid, the reverse gear devise and other accessories are not shown and are not part of the invention. The torque converters can be standard "off the shelf" items as well as the components used to assemble the bearing plates. The shaft that connects the output of one torque converter to the input of the next is again a standard automatic transmission input shaft modified to have a flange end at its output end to connect to and drive the next torque converter.

As few as two or as many as needed torque converters can be arranged in this way to provide the torque multiplication needed.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A torque converter transmission for use as a continually variable speed transmission comprising:
   (a) means for holding a plurality of lockup torque converters in alignment with a input motive force and a final drive output
   (b) means for transferring a first lockup torque converter output to a second lockup torque converter
   (c) means for transferring said second lockup torque converter output to a "nth" lockup torque converter
   (d) means for transferring said "nth" lockup torque converter output to said final drive whereby said torque converter transmission provides an equivalent numerical gear ratio of two to one for each said lockup torque converter with a final drive ratio of one to one continuously.

* * * * *